J. L. MOTT.
Ventilator.
No. 2,887. Patented Dec. 17, 1842.
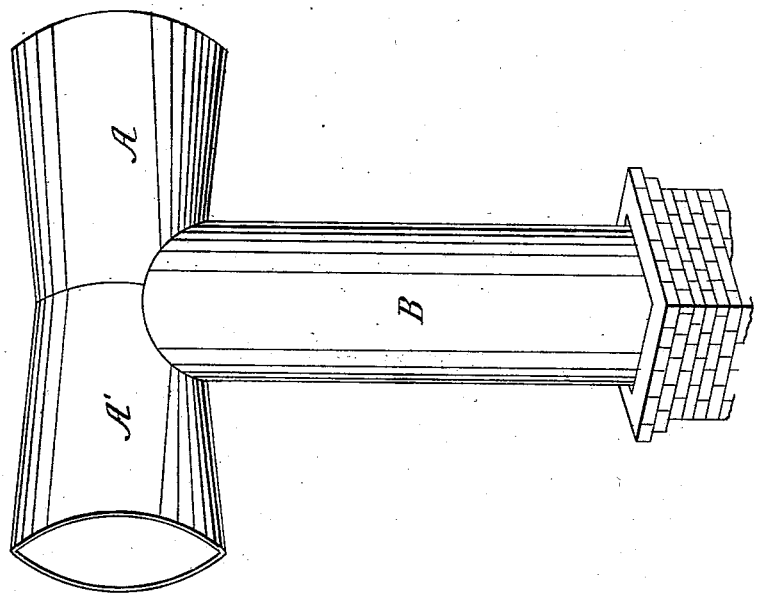
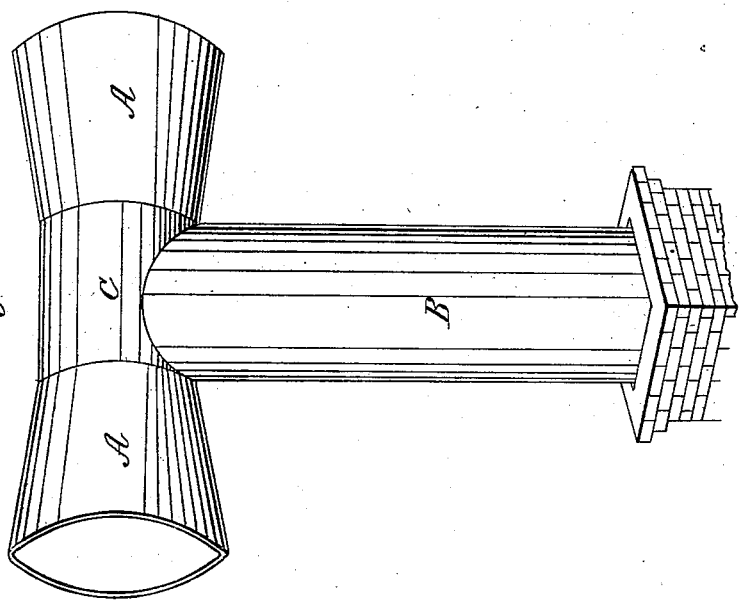

UNITED STATES PATENT OFFICE.

JORDAN L. MOTT, OF NEW YORK, N. Y.

IMPROVEMENT IN CHIMNEY-CAPS.

Specification forming part of Letters Patent No. 2,887, dated December 17, 1842.

*To all whom it may concern:*

Be it known that I, JORDAN L. MOTT, of the city of New York, in the State of New York, have invented a new and useful improvement in the manner of constructing a ventilator or chimney-cap which may be used for the purpose of ventilating mines, cellars, vaults, and all other apartments or structures from which a flue can be carried up so as to have its upper end exposed to the action of currents of air, and which is therefore particularly well adapted to the cure of smoky chimneys; and I do hereby declare that the following is a full and exact description thereof.

A distinguishing feature of my ventilator or chimney-cap is, that although consisting of a vertical surmounted by a horizontal tube, it is not made to revolve like the greater number of instruments for the same purpose, but is fixed permanently on the top of a chimney or flue. Its vertical tube must be of such size as shall adapt it to the chimney or flue upon which it is to be placed, and this vertical tube opens into a horizontal tube that is open at both its ends. The horizontal tube I usually form of two conical frustums of equal length, united together at their smaller ends, where their diameter should be about equal to that of the vertical tube, which enters them, and the whole length of said horizontal may be equal to about three times the diameter of the vertical tube. It is not necessary, however, to be particular in these dimensions, as the proportions named may be departed from without materially interfering with the action of the instrument. I sometimes make the horizontal tube cylindrical at its middle portion, where the vertical tube enters it, and attach a conical frustum to each end of said cylindrical part.

In the accompanying drawings, Figures 1 and 2 are perspective representations of my ventilator or chimney-cap.

In Fig. 1, A A' are two hollow conical frustums united together at their smaller ends, and B is the vertical tube which opens into them, the whole being shown as placed on the top of a chimney.

In Fig. 2, A A' are two similar conical frustums, having an intermediate cylindrical tube, C, between them, which is entered by the vertical tube B.

I have found by experiments carefully performed that a chimney-cap of this description will operate equally well with the wind blowing in a direction at right angles to the axis of the horizontal tube, or directly in the line of said axis, and that there is but little sensible difference in its beneficial effects when blowing from any intermediate quarter, and that this action is far more efficacious than that produced by ventilators or chimney-caps of any of the constructions heretofore known and used; and I have also ascertained that there is not, in any direction of the wind, the slightest tendency to the production of a downward draft in the chimney.

I have represented the tubes composing my apparatus as circular in their cross-section; but they may be oval or polygonal, and will still produce a like effect, their construction in other respects being as herein described.

Having thus fully described the manner in which I construct my ventilator or chimney-cap, what I claim therein as new, and desire to secure by Letters Patent, is—

The forming of the horizontal tube, which is open at both ends, of two hollow conical frustums, which are to be united together at their smaller ends, or of two such conical frustums connected together by an intermediate cylindrical tube, the vertical tube entering said horizontal tube at or near its middle, and the instrument, when thus formed, being permanently fixed upon the chimney or flue through which an upward draft is to be produced, the whole being combined, arranged, and operating substantially in the manner herein fully made known.

JORDAN L. MOTT.

Witnesses:
  EDWARD W. TELFAIR,
  AUGUSTUS F. WEEKE.